Patented June 10, 1952

2,600,287

UNITED STATES PATENT OFFICE 2,600,287

PREPARATION OF HALOALKANE SULFO-NATES AND TOLUIDINE DERIVATIVES THEREOF

John E. Wicklatz, Bartlesville, Okla., assignor to Phillips Petroleum Company, a corporation of Delaware No Drawing. Application December 31, 1948, Serial No. 68,735

1 Claim. (Cl. 260—501)

This invention relates to a process for the production of haloalkane sulfonates and the preparation of toluidine derivatives thereof. In one of its aspects, the invention relates to a direct route for the preparation of toluidine haloalkane sulfonates through the haloalkane sulfonates. In another of its aspects, the invention relates to a novel process for the preparation of haloalkane sulfonates and still further to the preparation of these compounds as intermediates in the preparation of toluidine haloalkane sulfonates. The invention also relates to the novel chemical compounds, toluidine haloalkane sulfonates.

In the preparation of toluidine haloalkane sulfonates, a novel process for the preparation of the intermediate haloalkane sulfonate compounds has also been developed. The haloalkane sulfonates themselves have numerous applications in the chemical field as wetting agents, detergents, intermediates in the production of other organic compounds, and the like. Previous methods employed in their production have involved difficulty available starting material as well as expensive and time-consuming operations which, in addition to the poor yields realized, have prevented their being of interest for large scale production. With the development of a cheaper and more effective process for their production, greater utility is possible. I have now discovered a process for the production of haloalkane sulfonates and for the production therefrom of toluidine haloalkane sulfonates, which is both efficient and readily effected. According to my process, I prepare an haloalkane sulfonates from relatively inexpensive starting materials by means of a novel process to obtain a compound necessary for reaction with a toluidine in the preparation of toluidine haloalkane sulfonate. In the operation of the present process, an alkenyl halide is reacted with an inorganic bisulfite in the presence of a catalytic amount of an oxidant, i. e., an oxidizing agent. The haloalkane sulfonate product of this reaction is then reacted with a toluidine under relatively mild conditions and a toluidine haloalkane sulfonate product is recovered. The reactions involved in my process may be represented by the following theoretical equations:

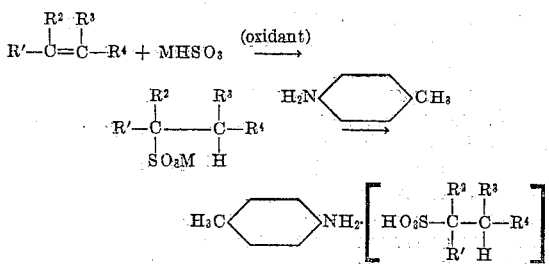

wherein R', R², R³ and R⁴ represent radicals from the group of hydrogen, halogen, alkyl, cycloalkyl, aryl, aralkyl, alkaryl, or halogen derivatives of the hydrocarbon radicals; and wherein the compound contains at least one and not more than four halogen atoms, at least two of the R groups being selected from the class consisting of hydrogen, alkyl and cycloalkyl, and M represents an inorganic cation. Although the process finds application in the preparation of innumerable compounds represented by the above formulae, it is especially applicable to the preparation of those sulfonate compounds in which the R groups represent straight or branched-chain alkyl groups which total up to 18 carbon atoms and in which M represents either an alkali metal or ammonium radical.

According to the process of my invention, an aqueous solution of a selected bisulfite and an alkenyl halide are admixed in a reactor in the presence of a catalytic amount of an oxidizing agent and after a suitable reaction period, the haloalkane sulfonate product is recovered and contacted with a substantially equimolar amount of toluidine in excess acid for a relatively short time during which these compounds react to form toluidine haloalkane sulfonate. The latter product may be recovered by cooling the reaction mixture and filtering out the crystalline product. For example, sodium bisulfite and vinyl chloride may be introduced into a reactor and oxygen introduced under pressure for a period of about 50 hours, the resulting sodium chlorethane sulfonate recovered and admixed with para-toluidine and crystalline para-toluidine 2-chlorethane sulfonate recovered.

The alkenyl halides employed in my process comprise both the straight and branched-chain compounds, particularly those alkenyl compounds typified by allyl chloride, 1-chloro-3-heptene, 3-chloro-1-dodecene, and the like. These compounds may contain the ethylenic linkage in any position and the halogen may be substituted for any hydrogen in the compound. These compounds may be obtained from any suitable source or may be prepared as needed by any of the well-known processes for their production.

The bisulfite reactant is any of the inorganic bisulfite compounds which is water-soluble and which ionizes to furnish bisulfite ions in aqueous solutions. Preferred bisulfite compounds are the alkali metal or ammonium bisulfites, since these compounds are readily available and easily handled. The oxidizing agent which is employed in the present process to promote the reaction between the alkenyl halide and the bisulfite compounds can be organic peroxides, such as benzoyl peroxide; organic hydroperoxides, such as cumene hydroperoxide; inorganic peroxidic materials, such as potassium persulfate, inorganic nitrates and nitrites; or oxygen itself.

The toluidines may be obtained from any suitable source or prepared by well-known reactions, such as the reduction of the corresponding nitro compound. Para-toluidine has been found to react readily with haloalkane sulfonates in the preparation of para-toluidine haloalkane sulfonate.

It has been found especially efficacious to conduct the reaction in which the haloalkane sulfonate is prepared in an aqueous emulsion which is defined as an agitated mixture of water-soluble and water-insoluble reactants. Thus in the present process, the aqueous solution of the bisulfite material is emulsified with the organic alkenyl halide during reaction. In some instances, emulsifying agents, for example aromatic sulfonates, amine salts such as dodecyl amine hydrochloride and the like, may be employed to promote a more effective contact between the reactants.

In the preparation of the intermediate haloalkane sulfonate compound, the bisulfite may be admixed with the alkenyl halide in a mol ratio of from 1:1 to 10:1. The temperature for the reaction will be in the range from about 15° to 150° C., preferably from about 25° to 75° C. These temperatures do not now appear to be critical and temperatures outside of this range either way may be employed if desired. The pressure employed will depend upon the reaction temperature selected and the alkenyl halide employed. When employing volatile alkenyl halides, it will usually be necessary to operate under pressure to maintain the reactants in liquid phase, but when employing high-boiling alkenyl halides below about 100° C., the process may usually be conducted at atmospheric pressure. In any event, the pressure should be sufficient to maintain the reactants in liquid phase. Agitation of the reaction mixture may be provided by any suitable means which will preferably maintain the reactants in an emulsified state during the reaction. The oxidizing agents may be added to the reactant mixture at the beginning of the process or may be added incrementally throughout the reaction. Where the process is operated under increased pressure, the pressuring atmosphere may be supplied by the oxidizing agent when this agent is gaseous at the operating temperature. When desirable, the haloalkane sulfonate product may be recovered and purified before being employed in the preparation of the toluidine haloalkane sulfonate. In order to purify the product, the reaction mixture may be neutralized and inorganic salts selectively removed by precipitating out these salts by the addition of a suitable alcohol, such as isopropyl alcohol, and the organic sulfonate may be recovered by evaporation of the solvent. Reaction times of from 5 to 50 hours are usually required to obtain substantial yields of haloalkane sulfonate products which, under favorable conditions, may amount to 90 mol per cent or more, particularly when unchanged reactants are recovered and recycled to the process.

In the preparation of the toluidine haloalkane sulfonate compound, a haloalkane sulfonate is admixed with a toluidine in substantially equimolar quantities in the presence of at least an equimolar quantity of aqueous acid, such as hydrochloric acid, and heated to a temperature from about 80° to 100° C., for a reaction time of a few minutes. The quantity of acid will not exceed 1.25 mols per mol of sulfonate. When the reaction mixture is cooled, crystalline toluidine haloalkane sulfonate precipitates and may be recovered readily by filtration or other suitable means. The type and quantity of mineral acid employed in this step will be so selected that it will not cause precipitation of toluidine in the form of its mineral acid salt.

Example I

A run was made wherein two molar aqueous sodium bisulfite and vinyl chloride were charged to a pressure reactor in mol ratio of reactants of 1 to 1. The reactor was then sealed and oxygen pressured in at about 90 pounds per square inch gauge with agitation until absorption ceased (about 50 hours). Temperature of the reaction mixture was maintained at 30° C. At the end of the reaction period the reactor was opened and pH of the reaction mixture adjusted to about 9 with aqueous sodium hydroxide. Inorganic salts consisting of sodium sulfate and unreacted sodium bisulfite were crystallized by adding isopropyl alcohol and were removed by filtration. Recovery of the organic sulfonate which was dissolved in the filtrate was effected by evaporation of the solvent at 50° C. and the product was then dried at 50° C. in a vacuum oven. A yield of sodium 2-chlorethane sulfonate of 46.6 per cent was obtained.

Example II

The experiment of Example I was repeated employing two molar aqueous sodium bisulfite and vinyl chloride in a mol ratio of reactants of 2 to 1. Temperature of the reaction mixture was maintained at 25° C. A yield of 89.6 per cent of sodium 2-chlorethane sulfonate was obtained.

Example III

A purified portion of the product of Example I (0.024 mol) was admixed with an equimolar amount of para-toluidine (0.026 mol) in excess hydrochloric acid (0.030 mol) and heated at about 100° C. for 5 minutes. The reaction mixture was then cooled and a substantially quantitative yield of crystalline para-toluidine 2-chlorethane sulfonate was recovered by filtration. This product had a melting point of 201–202° C. (uncorrected). Titration of a sample of this compound against standard alkali provided a neutral equivalent of 250.5, as compared to a calculated value of 251.5.

The foregoing examples and description are illustrative only and it is understood that various changes and modifications will be apparent to those skilled in the art and may be made in the process without departing from the spirit and inherent scope of the invention.

I claim:

A process for the preparation of para-toluidine 2-chlorethane sulfonate, comprising admixing an aqueous alkali metal bisulfite with vinyl chloride in a mol ratio of alkali metal bisulfite to vinyl chloride within the limits of 1:1 and 10:1, maintaining free oxygen in the resulting admixture at a temperature within the limits of 25 and 75° C. for a period of from 5 to 50 hours, recovering an alkali metal 2-chlorethane sulfonate from the resulting reaction mixture and admixing same with about an equimolar quantity of para-toluidine and introducing hydrochloric acid into the resulting last said admixture in a mol ratio of hydrochloric acid to said sulfonate within the limits of 1:1 and 1.25:1, maintaining the resulting hydrochloric acid-sulfonate admixture at a temperature of from 80 to 100° C. for a sufficient time to effect interreaction of para-toluidine and said sulfonate, and recovering para-toluidine 2- chlorethane sulfonate from the reaction mixture as a product of the process.

JOHN E. WICKLATZ.

REFERENCES CITED

The following references are of record in the file of this patent:

UNITED STATES PATENTS

| Number | Name | Date |
|---|---|---|
| 1,888,794 | Ernst et al. | Nov. 22, 1932 |
| 1,937,521 | Limburg | Dec. 5, 1933 |
| 1,944,300 | Ott | Jan. 23, 1934 |
| 2,076,623 | De Groote | Apr. 13, 1937 |
| 2,174,507 | Tinker | Sept. 26, 1939 |
| 2,243,331 | De Simo | May 27, 1941 |
| 2,243,332 | De Simo | May 27, 1941 |
| 2,318,036 | Werntz | May 4, 1943 |
| 2,323,714 | Kirby et al. | July 6, 1943 |
| 2,403,207 | Barrick | July 2, 1946 |

OTHER REFERENCES

Ambler, J., Ind. Eng. Chem., vol. 12 (1920), page 1081.

Forster, J., Soc. Chem. Ind., vol. 43 (1924), pages 165T–168T.

Forster and Ambler, "Organic Chemistry of Sulfur," by Suter, pages 384–385, 497 (1944).

Mellor, Comprehensive Treatise on Theoretical and Inorganic Chemistry, vol. 10, page 199.